US008127372B2

(12) United States Patent
Su

(10) Patent No.: US 8,127,372 B2
(45) Date of Patent: Mar. 6, 2012

(54) POLYISOPRENE AQUEOUS EMULSION AND A METHOD TO FABRICATE GLOVES AND RELATED PRODUCTS

(75) Inventor: Zongqiu Su, Shanghai (CN)

(73) Assignee: Shanghai Shengda Medical Application Co. Ltd., Shanghai (CN)

( * ) Notice: Subject to any disclaimer, the term of this patent is extended or adjusted under 35 U.S.C. 154(b) by 270 days.

(21) Appl. No.: 12/459,105

(22) Filed: Jun. 26, 2009

(65) Prior Publication Data

US 2010/0237541 A1 Sep. 23, 2010

(30) Foreign Application Priority Data

Mar. 19, 2009 (CN) .......................... 2009 1 0047806
Mar. 19, 2009 (CN) .......................... 2009 1 0047807

(51) Int. Cl.
*C08J 5/00* (2006.01)
(52) U.S. Cl. ............. 2/161.7; 526/80; 526/88; 526/342; 526/348.6
(58) Field of Classification Search .................... 526/80, 526/88, 342, 348.6; 2/161.7
See application file for complete search history.

(56) References Cited

U.S. PATENT DOCUMENTS 6,297,325 B1 * 10/2001 Wideman et al. ............. 525/282
6,476,109 B1 * 11/2002 Wideman et al. ............. 524/255

* cited by examiner

*Primary Examiner* — Kelechi Egwim
(74) *Attorney, Agent, or Firm* — John P. White; Cooper & Dunham LLP

(57) ABSTRACT

This invention relates to the method for fabrication of polyisoprene aqueous emulsion, gloves and related products thereof, wherein the aqueous emulsion is polyisoprene or polynitrile aqueous emulsion obtained through free-radical emulsion polymerization initiated by initiating agent under normal pressure with isoprene as the monomer, or isoprene monomer, acrylonitrile monomer, and (methyl)acrylic acid as the monomer mixture, and emulsifying agent and dispersing agent as the emulsification system. After the isoprene or the mixture of isoprene monomer, acrylonitrile monomer, and (methyl)acrylic acid is mixed with the initiating agent, the oil phase obtained together with reducing agent is added dropwise in different time quantums. The polymerization conversion rate of polyisoprene aqueous emulsion or polynitrile aqueous emulsion according to this invention is increased from the original 78% to over 97.5%. Fabricated polyisoprene or polynitrile gloves and thin latex products thereof have high strength and good extensibility, provide good hand touch, and do not cause allergies of the human body. They can be used for various purposes.

15 Claims, No Drawings

POLYISOPRENE AQUEOUS EMULSION AND A METHOD TO FABRICATE GLOVES AND RELATED PRODUCTS

TECHNICAL FIELD

This invention relates to a method for fabricating gloves and related products with polyisoprene aqueous emulsion, in particular a method that uses isoprene monomer or the mixture of isoprene monomer, acrylonitrile monomer, and methylacrylic acid to obtain polyisoprene aqueous emulsion or polynitrile aqueous emulsion through emulsion polymerization, and then uses polyisoprene emulsion or polynitrile aqueous emulsion to fabricate gloves and related products. It belongs to the fields of polymer chemistry, polymer physics, colloid chemistry, surface and interface chemistry, and rubber physics and chemistry.

BACKGROUND OF THE INVENTION

In recent years, synthetic latex has been developed rapidly. Latex products mainly include styrene butadiene latex, neoprene latex, NBRL latex, and acrylic ester latex. Synthetic latex is usually fabricated through emulsion polymerization with water as the medium. This method represents a tendency that solvent-borne products are being converted into aqueous products and has been widely applied to many fields such as rubber, coating materials, and adhesives.

Isoprene is an important conjugated diene mainly used as the monomer for the synthesis of polyisoprene rubber. There are many methods for fabricating isoprene in industrial production, such as olefin aldehyde synthesis, isopentane and isoamylene dehydrogenation, separate of $C_5$ fraction generated during the refining of ethylene, and the acetyenic ketone method, among them the $C_5$ fraction separation method is developed rapidly. In industrial production, isoprene monomer is mainly used to make polyisoprene through solution catalysis or ion polymerization, which can replace natural rubber. Polyisoprene can also be used to prepare emulsion for latex products.

There are two methods for the fabrication of polyisoprene emulsion at present: one is the external emulsification method, i.e. synthesizing cis-1,4-polyisoprene solution through anion polymerization or coordination polymerization with organic solvent as the medium, then high-speed blending the polyisoprene solution, water, and a proper amount of emulsifying agent for emulsification, and finally removing the solvent and concentrating the mixture to obtain polyisoprene emulsion. Polyisoprene latex that can be fabricated with this method includes butyl latex (isoprene-isobutene rubber latex), isoprene latex, and isoprene-acrylonitrile latex.

CN 1324874A discloses a method to obtain a polyisoprene rubber with high cis-1,4 double bond content. The polyisoprene rubber is obtained by polymerization of monomer isoprene, rare metal organic phosphate, and alkyl aluminum in inert organic hydrocarbon solvent.

CN 85102250B discloses a method for fabricating polyisoprene rubber through bulk polymerization under the effect of rare earth catalyst.

U.S. Pat. No. 3,285,869 discloses a method for fabricating polyisoprene emulsion, i.e. using Ziegler-Nata catalyst or Li catalyst to obtain polyisoprene solution through solution polymerization, and then emulsifying and dispersing the emulsion with emulsifying agent before removing the solvent.

U.S. Pat. No. 3,971,746 discloses a carboxylated polyisoprene emulsion, wherein 0.03%~20% carboxyl is introduced during solution polymerization to improve the stability after emulsification.

The other method is to use the traditional emulsion polymerization process and water as the medium to obtain a emulsion by free-radical copolymerization of isoprene and other unsaturated alkene monomers.

WO03/080722 A1 discloses a conjugated diene copolymer emulsion that can be used for dip forming, wherein the conjugated dienes include 1,3-butadiene and isoprene. The copolymer emulsion, obtained through the copolymerization of 30%~90% of isoprene, 0.1%~20% of unsaturated carboxylic acid, and 0~69.9% of other unsaturated monomers can meet the requirements of dip forming. Dip-formed gloves have excellent physical and mechanical properties and can be used for various purposes.

U.S. Pat. No. 6,878,766B2 discloses a copolymer emulsion for dip forming, wherein the monomers include isoprene. The embodiment is to copolymerize 60%~81% of butadiene, 2%~3.5% of unsaturated carboxylic acid, and 17-35% of alkylene unsaturated nitrile. Copolymer emulsion obtained can be used for dip forming of gloves.

Polyisoprene emulsion obtained by the first method mentioned above has excellent overall performance. The isoprene has a highly orderly structure. But a great amount of organic solvent is used during the production process which leads to environmental pollution problems and very complicated removal and recycling processes of the organic solvent, and thus to increase cost. In the second method, polar monomers such as acrylonitrile and acrylic acid are often introduced to copolymerize with isoprene in order to increase the strength and stability of the emulsion. But due to the differences in water-solubility and reactivity between comonomers, it is hard to control the polymerization reaction and the levels of molecular branching gelatinization are high. Latex products made by this method is inferior to those made by the first method. Up till now, there is no polyisoprene copolymer emulsion commercialized.

Natural latex gloves have excellent overall performance, but they are easy to cause skin allergies once used on a long-term basis. Synthetic latex products such as neoprene, butyronitrile and butylbenzene will not cause skin allergies due to proteins, and they have strong resistance to grease, chemicals, oxidation, ozonization, low permeability, and better anti-penetration performance than natural latex products. And they have the same hand touch as natural latex products. Neoprene and NBRL latex products have been industrialized, but the recycling treatment of neoprene latex products and the irritating smell of NBRL latex and its products have held back their popularization.

DETAILED DESCRIPTION OF THE INVENTION

The first technical problem to be solved by this invention is to provide a method for fabricating polyisoprene aqueous emulsion or polynitrile aqueous emulsion. By reasonably proportioning the emulsifying agent and optimizing the reaction process during the polymerization of isoprene monomer or the mixture of isoprene monomer, acrylonitrile monomer, and methylacrylic acid, stable polyisoprene aqueous latex can be obtained through free-radical emulsion polymerization at normal temperature and normal pressure. The emulsion fabrication process with this method is easy to control and provides stable product quality. Films made of this emulsion have excellent physical and mechanical properties and can be used for various purposes.

The second technical problem to be solved by this invention is to provide a method to fabricate gloves and related products with the aforementioned polyisoprene aqueous emulsion or polynitrile aqueous emulsion.

The method for fabrication of polyisoprene aqueous emulsion as the first aspect of this invention is to obtain stable polyisoprene rubber emulsion through free-radical emulsion polymerization with isoprene as the monomer, emulsifying agent and dispersing agent as the emulsification system, and using oxidation-reduction initiating agent system and initiating under normal pressure, characterized in that: after said isoprene is mixed with the initiating agent, the oil phase obtained, together with the reducing agent in the oxidation-reduction initiating agent system, is added dropwise in different time quantums.

In this invention, said dropwise addition is divided into three stages; for the stage 1, oil phase obtained by mixing isoprene monomer and initiating agent, the amount of dropwise added reducing agent is 5-15 wt % of their respective total weight; for the stage 2 oil phase obtained by mixing isoprene monomer and initiating agent, the amount of dropwise added reducing agent is 10-20 wt % of their respective total weight; for the stage 3 oil phase obtained by mixing isoprene monomer and initiating agent, the amount of dropwise added reducing agent is 65-85 wt % of their respective total masses.

The fabrication method for polynitrile aqueous emulsion as the first aspect of this invention is to obtain stable polynitrile aqueous emulsion through free-radical emulsion polymerization with a mixture of isoprene monomer (50-94 wt %), acrylonitrile monomer (5~42 wt %), and (methyl)acrylic acid (1-8 wt %), emulsifying agent and dispersing agent as the emulsification system, and using oxidation-reduction initiating agent system to initiate the reaction under normal pressure.

In one of the preferred embodiments of this invention, preferably, isoprene monomer is 60-80 wt %, acrylonitrile monomer is 20%-wt 40%.

Said oil phase obtained by mixing isoprene monomer, acrylonitrile monomer, and (methyl)acrylic acid with the initiating agent is added together with the reducing agent dropwise in different time quantums.

In this invention, said dropwise addition is divided into three stages; for the Stage 1 oil phase obtained by mixing isoprene monomer, acrylonitrile monomer, and (methyl)acrylic acid with the initiating agent, the amount of dropwise added reducing agent is 5-15 wt % of their respective total weight; for the stage 2 oil phase obtained by mixing isoprene monomer, acrylonitrile monomer, and (methyl)acrylic acid with the initiating agent, the amount of dropwise added reducing agent is 10-30 wt % of their respective total weight; for the stage 3 oil phase obtained by mixing isoprene monomer, acrylonitrile monomer, and (methyl)acrylic acid with the initiating agent, the amount of dropwise added reducing agent is 55-85 wt % of their respective total weight.

Since the purity of isoprene has a significant influence on the polymerization rate, the purity of isoprene monomer must be at least 98% in the fabrication method for polyisoprene rubber emulsion according to this invention.

The initiating agent of this invention is a peroxide, being 0.02~0.08 wt % of the weight of isoprene monomer or the monomer mixture of isoprene monomer, acrylonitrile monomer, and (methyl)acrylic acid.

Said peroxide is an acryl peroxide, a hydrogen peroxide, or a mixture thereof. Said acryl peroxide is a dibenzamide peroxide, a lauramide peroxide, a capramide peroxide, or a mixture of two or more of them. Benzoyl peroxide (BPO) is preferred.

Said hydrogen peroxide is hydroperoxide, pinane hydroperoxide, tert-butyl hydroperoxide, isopropylbenzene hydroperoxide, di-isopropylbenzene hydroperoxide, tri-isopropylbenzenehydroperoxide, tert-butyl isopropylbenzene hydroperoxide, chloro-di-isopropylbenzene hydroperoxide, or a mixture of two or more of them. Tert-buty hydroperoxide and di-isopropylbenzene hydroperoxide are preferred. Tert-butyl hydroperoxide is more preferred.

The emulsifying agent used in this invention is an anion-type emulsifying agent, a non-ion emulsifying agent, or a mixture thereof.

Anion-type emulsifying agents, which have a better emulsification ability, are preferred in this invention. Said anion-type emulsifying agents include, but are not limited to one of alkyl sulfates, alkane sulfonates, alkylbenzene sulfonates, and long-chain fatty acid salts.

Dodecyl sodium sulfate is preferred in said alkyl sulfates.

Said alkane sulfonate is preferably one of dodecyl sodium sulfonate and succinic alkyl ester sodium sulfonate.

Dodecyl sodium benzene sulfonate is preferred for said alkylbenzene sulfonates.

Sodium oleate, potassium oleate, and disproportionated rosin acid potash soap are preferred for said long-chain fatty acid salts.

Said non-ion emulsifying agents include, but are not limited to alkyl phenol polyethylene glycol oxide.

Said anion-type emulsifying agent is 2~12 wt %, preferably 4-10 wt % of the total weight of isoprene monomer or the monomer mixture of isoprene monomer, acrylonitrile monomer, and (methyl)acrylic acid.

The compound weight ratio of anion emulsifying agent mixture and cation emulsifying agent mixture is 9:1-1:9, preferably 5:1~1:5.

Said mixture emulsifying agent is 4-15 wt %, preferably 4-10 wt % of the total weight of isoprene monomer or the monomer mixture of isoprene monomer, acrylonitrile monomer, and (methyl)acrylic acid.

The addition of dispersing agent in this invention can lead to a more stable polymerization process, a high conversion rate, stable emulsion, less gelatin, and improved polymerization efficiency. Condensed formaldehyde naphthalene sulfonate is used as the dispersing agent. Said condensed formaldehyde naphthalene sulfonate is a commercial dispersing agent MF, dispersing agent NF, dispersing agent N, or a mixture dispersing agent composed of more than two of them.

Said dispersing agent is 0.05~1 wt %, preferably 0.1~0.8 wt % of the total weight of isoprene monomer or the monomer mixture of isoprene monomer, acrylonitrile monomer, and (methyl)acrylic acid.

The amount of reducing agent in the oxidation-reduction initiating system used in this invention is different with the selected type, but usually 0.22-2.6 wt %, preferably 0.22-1.3 wt % of the total weight of isoprene monomer or the monomer mixture of isoprene monomer, acrylonitrile monomer, and (methyl)acrylic acid.

Said reducing agent is sodium bisulfite, sodium formaldehyde sulfoxylate, sodium thiosulfate, sodium hydrosulfite, ferrous sulfate, ferrous chloride, ascorbic acid, or a mixture of two or more of them.

In the fabrication method for polyisoprene aqueous emulsion in this invention, a molecular weight regulating agent can also be used to control the molecular weight of polyisoprene. Said molecular weight regulating agent is 0.05-0.8 wt %, preferably 0.1-0.5 wt % of the total weight of isoprene monomer or the monomer mixture of isoprene monomer, acrylonitrile monomer, and (methyl)acrylic acid.

Said molecular weight regulating agent is n-dodecyl mercaptan, n-tetradecyl mercaptan, n-hexadecyl mercaptan, t-dodecyl mercaptan, t-tetradecyl mercaptan, t-hexadecyl mercaptan, or a mixture of two or more of them. N-dodecyl mercaptan and t-dodecyl mercaptan are preferred.

A tank reactor is used for the polymerization of polyisoprene aqueous emulsion or polynitrile aqueous emulsion in this invention. The reaction is conducted under normal pressure and can be divided into hot polymerization and cold polymerization: the temperature of hot polymerization is 20~32° C. and the total reaction time is 25~40; when the conversion rate of the reaction reaches above 97.5%, terminating agent and anti-aging agent are added to terminate the reaction. When the reaction is terminated, the polyisoprene latex is transferred into a degasification kettle where it passes through flash evaporation and steam to remove residual monomer.

The terminating agent used for the above-mentioned polymerization is a compound capable of terminating the free-radical polymerization. It is quinhydrone, hydroquinone, p-tert-butyl pyrocatechol, p-hydroxy methyl-phenoxide, diethanolameine, or sodium dimethyldithiocar-bamate (SDDC). Diethanolameine and sodium dimethyldithiocarbamate are preferred. The terminating agent is 0.05-0.5 wt %, preferably 0.1-0.3 wt % of the total weight of isoprene monomer or the monomer mixture of isoprene monomer, acrylonitrile monomer, and (methyl)acrylic acid. The anti-aging agent used for the above-mentioned polymerization is a phenol anti-aging agent, an amine anti-aging agent, a sulfurous ester anti-aging agent, or a thioester anti-aging agent, all of which are suitable for the emulsion mentioned in this invention. Phenol anti-aging agents are preferred. Said phenol anti-aging agent is anti-aging agent 264, anti-aging agent 2246, anti-aging agent 246, anti-aging agent SP, or anti-aging agent 4. The anti-aging agent is 0.2-4 wt %, preferably 0.3-2 wt % of the total weight of isoprene monomer or the monomer mixture of isoprene monomer, acrylonitrile monomer, and (methyl)acrylic acid.

The polyisoprene aqueous emulsion or polynitrile aqueous emulsion used in this invention is obtained through free-radical emulsion polymerization of isoprene monomer or the mixture of isoprene monomer, acrylonitrile monomer, and methylacrylic acid at normal temperature and normal pressure, wherein the isoprene monomer or the mixture of isoprene monomer, acrylonitrile monomer, and methylacrylic acid, the initiating agent, and the reducing agent are added dropwise in different time quantums, and the amount of the initiating agent and the reducing agent are increased in order to elevate the conversion rate of polymerization (from 78% to 97.5%). The entire emulsion polymerization process is smooth and has stable emulsion, less gelatin separated out, and high polymerization efficiency. The entire fabrication process is one with environment-friendly production features.

In the second aspect of this invention, the method using polyisoprene aqueous emulsion or polynitriles aqueous emulsion to make gloves and related thin latex products is to pre-sulphurize prepared polyisoprene aqueous emulsion or polynitriles aqueous emulsion and then use the dip forming process to make latex gloves and related thin products.

The dip forming process is an ion-deposition gelatinization process, the specific steps being as follows:
1. Mold cleaning: dry the mold under 60~100° C. for 0.5~5 minutes.
2. Dipping coagulating agent: dry the coagulating agent under 80~120° C. for 0.5~8 minutes.
3. Dipping emulsion: dry the emulsion under 60~100° C. for 0.5~5 minutes.
4. Percolation and edge curling under 50~70° C.;
5. Cross-bonding: perform cross-bonding under 80~120° C. for 1~10 minutes.
6. Demolding;
7. Rinsing and percolation with 50~80° C. hot water, and post-treatment to obtain gloves and related thin latex products.

Polyisoprene or isonitrile latex gloves and related products fabricated meet requirements of all levels and purposes and can be easily demolded, which makes them suitable for industrial stream line production.

Said pre-sulfurization is to add sulfur that of 100-500 nm in particle diameter and aqueous dispersion of zinc oxide into polyisoprene aqueous emulsion or polynitriles aqueous emulsion, heat the mixture to 40° C.-60° C., stir it for 1-2 h under thermal insulation, and then keep it at normal temperature for 24-48 h. After being rested, the emulsion is fully cured and has more stable properties, which make it suitable for the fabrication of thin latex products such as latex gloves of 0.03-0.10 mm in thickness.

In the aforementioned pre-sulfurization step, the amount of sulfur is 0.5-3 wt % of the weight of emulsion, and the amount of zinc oxide is 0.5-5 wt % of the weight of emulsion.

In the aforementioned pre-sulfurization step, said zinc oxide is partly replaced by sulfurization accelerating agent BZ, wherein the amount of sulfurization accelerating agent BZ is 0.5-3 wt % of the weight of emulsion, and the amount of zinc oxide is 0-5 wt % of the weight of emulsion.

In the aforementioned pre-sulfurization step, the fabrication method of sulfur and sulfurization accelerating agent aqueous dispersion is to make sulfur, zinc oxide or zinc oxide, and sulfurization accelerating agent into an aqueous solution system and then put it to ball grinding for at least 72 h to obtain 500 mg/h aqueous dispersion.

The function of sulfur used for the pre-sulfurization in this invention is to provide a sulfur source for the pre-sulfurization of the emulsion. Sulfurization accelerating agents such as zinc oxide can activate the sulfurization effect of sulfur and cross-bond the carboxyl constituents in the emulsion in order to increase the wet gelatin strength in the initial stages of the fabrication process of gloves and related thin latex products, and thus to facilitate the fabrication of thin latex gloves and related thin latex products (such as latex gloves 0.03 mm in thickness). Since the transparency of gloves and related thin latex products will decrease with the increase of amount of zinc oxide, the zinc oxide is partly replaced by sulfurization accelerating agent in this invention to promote the sulfurization effect of sulfur and significantly increase the transparency of gloves.

The pre-sulfurization of this invention will generally go through the following four stages: 1. Sulfurization complexing agent particles collide with latex particles in the Brownian motion process in which aggregates of several types of particles are formed; 2. Small molecules of sulfurization complexing agent particles enter latex particles through diffusion and force of electric charge; 3. Some small molecules of the sulfurization complexing agent will have chemical cross-bonding reaction with latex particles to form a net-shaped structure of covalent bonds; 4. Small molecules of the new sulfurization complexing agent will continuously diffuse in latex particles and enter the inside of latex particles to create new cross-bonding reactions and continuously repeat Stage 2 and Stage 3.

The activity of sulfurization complexing agent is far lower under room temperature than under sulfurization temperature. Therefore although rubber molecules will still be gradually interlinked and continuously pushed inward from the outside of latex particles, the dissolution and diffusion of small complexing agent molecules in latex particles will prevail and they will become more and more evenly distributed with the resting time.

Therefore, the pre-sulfurization process of the emulsion is the collective result of both chemical and physical effects. It significantly shortens the sulfurization process of latex and leads to more stable gelatin properties, and thus facilitates the next processing step.

A coagulating agent is used for gelatinization in the ion-deposition gelatinization step of this invention. The coagulating agent used is a solution consisting of high valence metal cation salt and an auxiliary agent. The metal cation salt is calcium chloride, zinc and aluminum chloride, or a nitrate.

Due to the use of aforementioned technical scheme, said gloves and related thin latex products obtained with this invention have a film thickness of 0.03-0.50 mm, a film tensile strength greater than 14 MPa, and an elongation greater than 700%. Polyisoprene gloves according to this invention are fabricated by a environment-friendly production process and have excellent product performance, and can be applied to many fields such as health and medicine, electronic industry, national defense, and daily life.

In the second aspect of this invention, the polyisoprene rubber or polyisonitrile rubber is obtained through the gelatinization, filtration, rinsing, and drying of degasified polyisoprene aqueous emulsion or polynitrile aqueous emulsion, the specific steps being:

(1) Adding coagulating agent into polyisoprene aqueous emulsion or polynitrile aqueous emulsion. The stable polyisoprene emulsion will have unstable coagulation under the effect of the coagulating agent and generate serum containing slab rubber.

(2) Filtration: to separate slab rubber from the serum;

(3) Rinsing: transfer slab rubber into a rinsing bowl and rinse it with water;

(4) Filtration: separate slab rubber from rinsed serum;

(5) Dehydrating and drying slab rubber.

The coagulating agent of this invention is an inorganic acid, a metal salt, or a polymeric flocculant.

Said inorganic acid is hydrochloric acid, sulfuric acid, or nitric acid. Sulfuric acid is preferred.

Said metal salt is a uni-valence, bi-valence, or tri-valence metal salt. Said uni-valence metal salt is a $Na^+$ salt; said bi-valence metal salt is a $Mg^{2+}$, $Ca^{2+}$, or $Zn^{2+}$ salt; said tri-valence metal salt is a $Al^{3+}$ salt. Said $Na^+$ salt is NaCl; said $Mg^{2+}$ salt is $MgCl_2$ or $MgSO_4$; said $Ca^{2+}$ salt is $CaCl_2$ or $Ca(NO_3)_2$; said $Zn^{2+}$ salt is $Zn(NO_3)_2$; said $Al^{3+}$ salt is $AlCl_3$ or $Al_2(SO_4)_3$. $MgSO_4$, $CaCl_2$, and $Al_2(SO_4)_3$ are preferred for said metal salts.

Said polymeric flocculant is polyacrylamide.

In one of the preferred embodiments of this invention, a combination of $CaCl_2$ and sulfuric acid is preferred as the coagulating agent, of which $CaCl_2$ is the main coagulating agent, being 8~40 wt % of the total weight of the emulsion. It is usually made into a aqueous solution with a weight concentration of 5~30%, preferably 10~20%. Sulfuric acid is used as the auxiliary coagulating agent which regulates the pH value of the serum and keeps it between 5~8; a pH value of 5.5~7 is preferred.

In the aforementioned Step (2), the serum is separated from polyisoprene rubber or polyisonitrile slab rubber through filtering separation on a vibration sieve or vibration bed, and then taken into a rinsing tank or rinsing pool equipped with a blending device.

In the aforementioned Step (3), slab rubber is taken into a rinsing tank or rinsing pool equipped with a blending device for rinsing in order to remove the coagulating agent, emulsifying agent, and other soluble impurities.

In the aforementioned Step (4), the rinsed serum is separated from slab rubber through filtering separation on a vibration sieve or vibration bed.

Since the slab rubber obtained through filtration contains a lot of moisture, it must be further dehydrated and dried. Therefore in the aforementioned Step (5), the water-containing slab rubber is taken into a centrifuge for dehydration, after which it is taken into a dryer where it is dried and thus becomes crude rubber. A horizontal centrifuge is preferred. Dynamic dryers are preferred, including but not limited to fluidized bed dryer and spiral flash evaporation dryer.

Generally, the serum filtered through the vibration sieve or vibration bed in aforementioned Step (2) and Step (4) is sent back to the coagulator, wherein the coagulating agent can be recycled. Unrecyclable rinsing water is drained into a sewage disposal pool where it is discharged after being properly treated.

A common rubber processing method is adopted for the mixing and sulfurization of polyisoprene rubber or isonitrile rubber obtained with this invention. 100 parts of polyisoprene rubber, 1.5 parts of stearic acid, 1 part of accelerating agent DM, 5 parts of zinc oxide, 40 parts of semi-reinforcing furnace black, and 1.5 parts of sulfur are mixed with a two-roll mill and then kept at 145° C. for 50 min under a certain pressure on a flat vulcanizing machine. The properties of obtained rubber samples are tested according to related national standards. Polyisoprene rubber or isonitrile rubber fabricated with this invention can be used for all kinds of tires, triangular belts, conveyor belts, sealing rings, rubber hoses, rubber shoes, buffer blocks, and other rubber products.

It will generally go through the following four stages: X salt, X salt or nitrate, hyalurate, mass percentage(???)

EXAMPLES

It is to be expressly understood that the following examples are adjust forth as detailed descriptions of this invention and not by way of limitations on the technical plan of this invention.

Example 1

Nitrogen is pumped into the bottom of the polymerization kettle for 15 min, and then 110 parts of de-ionized water is added into the polymerization kettle. Blend and dissolve all ethylenediamine tetraacetic acid (EDTA), dodecyl sodium benzene sulfonate (SBLS), dodecyl sodium sulfate (SDS), dispersing agent (MF), cis-dodecyl mercaptan (DM), sodium pyrophosphate, NaHCO3, and Formosul (SFS) as shown in Table 1 to obtain an aqueous phase. Blend and dissolve isoprene monomer (IP) and benzoyl peroxide (BPO) to obtain an oil phase. Blend and dissolve 50 parts of de-ionized water and ferrous sulfate ($FeSO_4$) to obtain an aqueous phase.

Keep the reaction temperature at 10° C.~30° C. and perform Stage 1 dropwise addition. The mixture amount of isoprene monomer (IP) and benzoyl peroxide (BPO) added dropwise in Stage 1 is 5 wt % of their total mixture weight. The amount of ferrous sulfate (FeSO$_4$) synchronously added dropwise is 5 wt % of its total weight. After the dropwise addition of Stage 1 is completed, allow the reaction for 3 h. After the reaction of Stage 1 is completed, start the dropwise addition of Stage 2. The mixture amount of isoprene monomer (IP) and benzoyl peroxide (BPO) added dropwise in Stage 2 is 15 wt % of their total mixture weight. The amount of ferrous sulfate (FeSO$_4$) synchronously added dropwise is 15 wt % of its total weight. After the dropwise addition of Stage 2 is completed, allow the reaction for 3 h. After the reaction of Stage 2 is completed, start the dropwise addition of Stage 3. The rest mixture amount of isoprene monomer (IP) and benzoyl peroxide (BPO) is added dropwise in Stage 3. The rest amount of ferrous sulfate (FeSO$_4$) is synchronously added dropwise. After the reaction of Stage 3 is completed, further allow the reaction for 12~20 h to obtain stable white polyisoprene aqueous emulsion. After the polymerization is over, add 0.2 wt % terminating agent diethanolameine, based on the weight of isoprene, and 1.0 wt % anti-aging agent 264, based on the weight of isoprene, and adjust the pH value to about 8.0. Raise the temperature to 50° C. Inject steam to keep the temperature, and keep a vacuum level higher than 0.8 Pa for 1~5 h to remove the residual monomer. Its solid content is 35.0%; pH is about 8.0; particle diameter is 80 nm.

Example 2

Nitrogen is pumped into the bottom of the polymerization kettle for 15 min, and then 110 parts of de-ionized water is added into the polymerization kettle. Blend and dissolve all ethylenediamine tetraacetic acid (EDTA), dodecyl sodium benzene sulfonate (SBLS), dodecyl sodium sulfate (SDS), dispersing agent (MF), cis-dodecyl mercaptan (DM), sodium pyrophosphate, NaHCO3, and Formosul (SFS) as shown in Table 1 to obtain an aqueous phase. Blend and dissolve isoprene monomer (IP) and benzoyl peroxide (BPO) to obtain an oil phase. Blend and dissolve 50 parts of de-ionized water and ferrous sulfate (FeSO$_4$) to obtain an aqueous phase.

Keep the reaction temperature at 10° C.~30° C. and perform Stage 1 dropwise addition. The mixture amount of isoprene monomer (IP) and benzoyl peroxide (BPO) added dropwise in Stage 1 is 5 wt % of their total mixture weight. The amount of ferrous sulfate (FeSO$_4$) synchronously added dropwise is 8 wt % of its total weight. After the dropwise addition of Stage 1 is completed, allow the reaction for 2 h. After the reaction of Stage 1 is completed, start the dropwise addition of Stage 2. The mixture amount of isoprene monomer (IP) and benzoyl peroxide (BPO) added dropwise in Stage 2 is 15 wt % of their total mixture weight. The amount of ferrous sulfate (FeSO$_4$) synchronously added dropwise is 12 wt % of its total weight. After the dropwise addition of Stage 2 is completed, allow the reaction for 2 h. After the reaction of Stage 2 is completed, start the dropwise addition of Stage 3. The rest mixture amount of isoprene monomer (IP) and benzoyl peroxide (BPO) is added dropwise in Stage 3. The rest amount of ferrous sulfate (FeSO$_4$) is synchronously added dropwise. After the reaction of Stage 3 is completed, further allow the reaction for 12~20 h to obtain stable white polyisoprene aqueous emulsion. After the polymerization is over, add 0.2 wt % terminating agent diethanolameine, based on the weight of isoprene and 1.0 wt % anti-aging agent 264, based on the weight of isoprene, and adjust the pH value to about 8.0. Raise the temperature to 50° C. Inject steam to keep the temperature, and keep a vacuum level higher than 0.8 Pa for 15 h to remove the residual monomer. Its solid content is 35.0%; pH is about 8.0; particle diameter is 120 nm.

Example 3

Nitrogen is pumped into the bottom of the polymerization kettle for 15 min, and then 110 parts of de-ionized water is added into the polymerization kettle. Blend and dissolve all ethylenediamine tetraacetic acid (EDTA), dodecyl sodium benzene sulfonate (SBLS), dodecyl sodium sulfate (SDS), dispersing agent (MF), cis-dodecyl mercaptan (DM), sodium pyrophosphate, NaHCO3, and Formosul (SFS) as shown in Table 1 to obtain an aqueous phase. Blend and dissolve isoprene monomer (IP) and benzoyl peroxide (BPO) to obtain an oil phase. Blend and dissolve 50 parts of de-ionized water and ferrous sulfate (FeSO$_4$) to obtain an aqueous phase.

Keep the reaction temperature at 10° C.~30° C. and perform Stage 1 dropwise addition. The mixture amount of isoprene monomer (IP) and benzoyl peroxide (BPO) added dropwise in Stage 1 is 5 wt % of their total mixture weight. The amount of ferrous sulfate (FeSO$_4$) synchronously added dropwise is 12 wt % of its total weight. After the dropwise addition of Stage 1 is completed, allow the reaction for 1 h. After the reaction of Stage 1 is completed, start the dropwise addition of Stage 2. The mixture amount of isoprene monomer (IP) and benzoyl peroxide (BPO) added dropwise in Stage 2 is 15 wt % of their total mixture weight. The amount of ferrous sulfate (FeSO$_4$) synchronously added dropwise is 18 wt % of its total weight. After the dropwise addition of Stage 2 is completed, allow the reaction for 1 h. After the reaction of Stage 2 is completed, start the dropwise addition of Stage 3. The rest mixture amount of isoprene monomer (IP) and benzoyl peroxide (BPO) is added dropwise in Stage 3. The rest amount of ferrous sulfate (FeSO$_4$) is synchronously added dropwise. After the reaction of Stage 3 is completed, further allow the reaction for 12~20 h to obtain stable white polyisoprene aqueous emulsion. After the polymerization is over, add 0.2 wt % terminating agent diethanolameine, based on the weight of isoprene, and 1.0 wt % anti-aging agent 264, based on the weight of isoprene, and adjust the pH value at about 8.0. Raise the temperature to 50° C. Inject steam to keep the temperature, and keep a vacuum level higher than 0.8 Pa for 1~5 h to remove the residual monomer. Its solid content is 35.0%; pH is about 8.0; particle diameter is 110 nm.

Example 4

Nitrogen is pumped into the bottom of the polymerization kettle for 15 min, and then 110 parts of de-ionized water is added into the polymerization kettle. Blend and dissolve all ethylenediamine tetraacetic acid (EDTA), dodecyl sodium benzene sulfonate (SBLS), dodecyl sodium sulfate (SDS), dispersing agent (MF), cis-dodecyl mercaptan (DM), sodium pyrophosphate, NaHCO3, and Formosul (SFS) as shown in Table 1 to obtain an aqueous phase. Blend and dissolve isoprene monomer (IP) and benzoyl peroxide (BPO) to obtain an oil phase. Blend and dissolve 50 parts of de-ionized water and ferrous sulfate (FeSO$_4$) to obtain an aqueous phase.

Keep the reaction temperature at 10° C.~30° C. and perform Stage 1 dropwise addition. The mixture amount of isoprene monomer (IP) and benzoyl peroxide (BPO) added dropwise in Stage 1 is 5 wt % of their total mixture weight. The amount of ferrous sulfate (FeSO$_4$) synchronously added dropwise is 15 wt % of its total weight. After the dropwise addition of Stage 1 is completed, allow the reaction for 0.5 h. After the reaction of Stage 1 is completed, start the dropwise addition of Stage 2. The mixture amount of isoprene monomer (IP) and benzoyl peroxide (BPO) added dropwise in Stage 2 is 15 wt % of their total mixture weight. The amount of ferrous sulfate (FeSO$_4$) synchronously added dropwise is 20 wt % of its total weight. After the dropwise addition of Stage 2 is completed, allow the reaction for 0.5 h. After the reaction of Stage 2 is completed, start the dropwise addition of Stage 3. The rest mixture amount of isoprene monomer (IP) and benzoyl peroxide (BPO) is added dropwise in Stage 3. The rest amount of ferrous sulfate (FeSO$_4$) is synchronously added dropwise. After the reaction of Stage 3 is completed, further allow the reaction for 12~20 h to obtain stable white polyisoprene aqueous emulsion. After the polymerization is over, add 0.2 wt % terminating agent diethanolameine, based on the weight of isoprene and 1.0 wt % anti-aging agent 264, based on the weight of isoprene, and adjust the pH value at about 8.0. Raise the temperature to 50° C. Inject steam to keep the temperature, and keep a vacuum level higher than 0.8 Pa for 1~5 h to remove the residual monomer. Its solid content is 35.0%; pH is about 8.0; particle diameter is 150 nm.

TABLE 1

Constituents in the polymerization of polyisoprene aqueous emulsion

| Constituent | Parts by weight | | | |
|---|---|---|---|---|
| | Example 1 | Example 2 | Example 3 | Example 4 |
| Isoprene (IP) | 100 | 100 | 100 | 100 |
| Ethylenediamine tetraacetic acid (EDTA) | 0.0125 | 0.125 | 0.3125 | 0.625 |
| Sodium pyrophosphate (Na$_4$P$_2$O$_7$) | 0.3125 | 0.625 | 1.875 | 3.125 |
| Formosul (SFS) | 0.0125 | 0.125 | 0.3125 | 0.625 |
| Nonyl phenol polyoxyethylene ether (OP-10) | 1 | 4 | 4 | 2 |
| Dodecyl sodium sulfate (SDS) | 0.5 | 1.5 | 3 | 5 |
| Dodecyl sodium benzene sulfonate (SBLS) | 0.5 | 1.5 | 3 | 5 |
| Benzoyl peroxide (BPO) | 0.2 | 0.4 | 2 | 2.6 |
| Ferrous sulfate (FeSO$_4$) | 0.2 | 0.4 | 2 | 2.6 |
| Sodium bicarbonate (NaHCO$_3$) | 0.125 | 0.5 | 1 | 1.25 |
| Dispersing agent (MF) | 0.05 | 0.1 | 0.5 | 1 |
| Cis-dodecyl mercaptan (DM) | 0.125 | 0.125 | 0.3125 | 0.625 |
| De-ionized water | 160 | 160 | 160 | 160 |
| Accelerating agent diethanolameine | 0.08 | 0.2 | 0.5 | 0.8 |
| Anti-aging agent 264 | 0.5 | 1 | 2 | 2.5 |

Example 5

Prepare an aqueous solution system with 100 parts of polyisoprene aqueous emulsion fabricated in Example 1, 0.5 parts of sulfur 100-500 nm in grain diameter and 0.5 parts of zinc dioxide. Ball-grind it for more than 72 h to obtain 500 mg/h aqueous dispersion, and then add the obtained aqueous dispersion into polyisoprene aqueous emulsion and fully mix them. Blend the mixture under 40°-60° for 1 h for pre-sulfurization. After pre-sulfurization, rest the polyisoprene aqueous emulsion 24 h under room temperature for curing, then take it to the glove production line together with a prepared coagulating agent of calcium nitrate aqueous solution with a weight percentage concentration of 15~30%.

The ion-deposition gelatinizing process is adopted for the entire dip forming process of gloves, the specific steps being as follows:

1. Mold cleaning: dry the mold under 60~100° for 0.5~5 minutes.
2. Dipping coagulating agent: dry the coagulating agent under 80~120° for 0.5~8 minutes.
3. Dipping emulsion: dry the emulsion under 60~100° for 0.5~5 minutes.
4. Percolation and edge curling under 50~70°;
5. Cross-bonding: perform cross-bonding under 80~120° for 1~10 minutes.
6. Demolding;
7. Rinsing and percolation with 50~80° hot water, and post-treatment to obtain gloves and related thin latex products.

The film thickness of transparent latex gloves obtained is 0.03-0.50 mm, the rupture strength is greater than 10 MPa, and the rupture elongation is greater than 700%. The film has a good hand touch and strong rebound resilience.

Example 6

Prepare an aqueous solution system with 100 parts of polyisoprene aqueous emulsion fabricated in Example 2, 1 parts of sulfur 100-500 nm in particle diameter, and 1 parts of zinc dioxide. Ball-grind it for more than 72 h to obtain 500 mg/h aqueous dispersion, and then add the obtained aqueous dispersion into polyisoprene aqueous emulsion and fully mix them. Blend the mixture under 40°-60° for 1 h for pre-sulfurization. After pre-sulfurization, rest the polyisoprene aqueous emulsion 24 h under room temperature for curing, then take it to the glove production line together with a prepared coagulating agent of Calcium chloride aqueous solution with a weight percentage concentration of 15~30%.

The ion-deposition gelatinizing process is adopted for the entire dip forming process of gloves, the specific steps being as follows:

1. Mold cleaning: dry the mold under 60~100° for 0.5~5 minutes.
2. Dipping coagulating agent: dry the coagulating agent under 80~120° for 0.5~8 minutes.
3. Dipping emulsion: dry the emulsion under 60~100° for 0.5~5 minutes.
4. Percolation and edge curling under 50~70 °;
5. Cross-bonding: perform cross-bonding under 80~120° for 1~10 minutes.
6. Demolding;
7. Rinsing and percolation with 50~80° hot water, and post-treatment to obtain gloves and related thin latex products.

The film thickness of transparent latex gloves obtained is 0.03-0.50 mm, the rupture strength is greater than 10 MPa, and the rupture elongation is greater than 700%. The film has a good hand touch and strong rebound resilience.

Example 7

Prepare an aqueous solution system with 100 parts of polyisoprene aqueous emulsion fabricated in Example 3, 2.0 parts of sulfur 100-500 nm in particle diameter, 1.0 part of zinc dioxide, and 1 part of sulfurization accelerating agent BZ. Ball-grind it for more than 72 h to obtain 500 mg/h aqueous dispersion, and then add the obtained aqueous dispersion into polyisoprene aqueous emulsion and fully mix them. Blend the mixture under 40☐-60☐ for 1.5 h for pre-sulfurization. After pre-sulfurization, rest the polyisoprene aqueous emulsion 24 h under room temperature for curing, then take it to the glove production line together with a prepared coagulating agent of zinc chloride aqueous solution with a weight percentage concentration of 15~30%.

The ion-deposition gelatinizing process is adopted for the entire dip forming process of gloves, the specific steps being as follows:

1. Mold cleaning: dry the mold under 60~100☐ for 0.5~5 minutes.
2. Dipping coagulating agent: dry the coagulating agent under 80~120☐ for 0.5~8 minutes.
3. Dipping emulsion: dry the emulsion under 60~100☐ for 0.5~5 minutes.
4. Percolation and edge curling under 50~70☐;
5. Cross-bonding: perform cross-bonding under 80~120☐ for 1~10 minutes.
6. Demolding;
7. Rinsing and percolation with 50~80☐ hot water, and post-treatment to obtain gloves and related thin latex products.

The film thickness of transparent latex gloves obtained is 0.03-0.2 mm, the rupture strength is greater than 10 MPa, and the rupture elongation is greater than 700%. The film has a good hand touch and strong rebound resilience.

Example 8

Prepare an aqueous solution system with 100 parts of polyisoprene aqueous emulsion fabricated in Example 4, 1.5 parts of sulfur 100-500 nm in particle diameter, 0.5 part of zinc dioxide, and 1 part of sulfurization accelerating agent BZ. Ball-grind it for more than 72 h to obtain 500 mg/h aqueous dispersion, and then add the obtained aqueous dispersion into polyisoprene aqueous emulsion and fully mix them. Blend the mixture under 40☐-60☐ for 1 h for pre-sulfurization. After pre-sulfurization, rest the polyisoprene aqueous emulsion 24 h under room temperature for curing, then take it to the glove production line together with a prepared coagulating agent of Zinc nitrate aqueous solution with a weight percentage concentration of 15~30%.

The ion-deposition gelatinizing process is adopted for the entire dip forming process of gloves, the specific steps being as follows:

1. Mold cleaning: dry the mold under 60~100☐ for 0.5~5 minutes.
2. Dipping coagulating agent: dry the coagulating agent under 80~120☐ for 0.5~8 minutes.
3. Dipping emulsion: dry the emulsion under 60~100☐ for 0.5~5 minutes.
4. Percolation and edge curling under 50~70☐;
5. Cross-bonding: perform cross-bonding under 80~120☐ for 1~10 minutes.
6. Demolding;
7. Rinsing and percolation with 50~80☐ hot water, and post-treatment to obtain gloves and related thin latex products.

The film thickness of transparent latex gloves obtained is 0.03-0.2 mm, the rupture strength is greater than 10 MPa, and the rupture elongation is greater than 700%. The film has a good hand touch and strong rebound resilience.

Example 9

Prepare an aqueous solution system with 100 parts of polyisoprene aqueous emulsion fabricated in Example 4, 1.5 parts of sulfur 100-500 nm in particle diameter, 0.5 part of zinc dioxide, and 1.5 parts of sulfurization accelerating agent BZ. Ball-grind it for more than 72 h to obtain 500 mg/h aqueous dispersion, and then add the obtained aqueous dispersion into polyisoprene aqueous emulsion and fully mix them. Blend the mixture under 40° C.-60° C. for 2 h for pre-sulfurization. After pre-sulfurization, rest the polyisoprene aqueous emulsion 24 h under room temperature for curing, then take it to the glove production line together with a prepared coagulating agent of Zinc nitrate aqueous solution with a weight percentage concentration of 15~30%.

The ion-deposition gelatinizing process is adopted for the entire dip forming process of gloves, the specific steps being as follows:

1. Mold cleaning: dry the mold under 60~100° C. for 0.5~5 minutes.
2. Dipping coagulating agent: dry the coagulating agent under 80~120° C. for 0.5~8 minutes.
3. Dipping emulsion: dry the emulsion under 60~100° C. for 0.5~5 minutes.
4. Percolation and edge curling under 50~70° C.;
5. Cross-bonding: perform cross-bonding under 80~120° C. for 1~10 minutes.
6. Demolding;
7. Rinsing and percolation with 50~80☐ hot water, and post-treatment to obtain gloves and related thin latex products.

The film thickness of transparent latex gloves obtained is 0.03-0.2 mm, the rupture strength is greater than 10 MPa, and the rupture elongation is greater than 650%. The film has a good hand touch and strong rebound resilience.

Example 10

Nitrogen is pumped into the bottom of the polymerization kettle for 30 min, and then 110 parts of de-ionized water is added into the polymerization kettle, Blend and dissolve dodecyl sodium benzene sulfonate (SBLS), cis-dodecyl mercaptan (DM), dispersing agent (MF), and NaHCO3 as shown in Table 2 to obtain an aqueous phase. Add all IP and CHP into the monomer kettle and blend and dissolve them to obtain an oil phase. Add 45 parts of de-ionized water and all $FeSO_4$ into the reducing agent kettle and dissolve them to obtain an aqueous solution.

Keep the reaction temperature at 15☐~30☐ and perform Stage 1 dropwise addition. The amount of isoprene monomer (IP) and cumene hydroperoxide (CHP) added dropwise in Stage 1 is 10 wt % of their total weight. The amount of ferrous sulfate ($FeSO_4$) synchronously added dropwise is 10 wt % of its total weight. After the dropwise addition of Stage 1 is completed, allow the reaction for 1 h. After the reaction of Stage 1 is completed, start the dropwise addition of Stage 2.

The amount of isoprene monomer (IP) and cumene hydroperoxide (CHP) added dropwise in Stage 2 is 20 wt % of their total weight. The amount of ferrous sulfate ($FeSO_4$) synchronously added dropwise is 20 wt % of its total weight. After the dropwise addition of Stage 2 is completed, allow the reaction for 2 h. After the reaction of Stage 2 is completed, start the dropwise addition of Stage 3. The rest of isoprene monomer (IP) and cumene hydroperoxide (CHP) is added dropwise in Stage 3. The rest amount of ferrous sulfate ($FeSO_4$) is synchronously added dropwise. After the dropwise addition is completed, further allow the reaction for 12~20 h to obtain stable white polyisoprene aqueous emulsion. After the polymerization is over, add 0.08 wt % terminating agent diethanolameine, based on the weight of isoprene and 0.5 wt % anti-aging agent, based on the weight of isoprene, and adjust the pH value at about 8.0. Raise the temperature to 50□. Remove the residual monomer. Its solid content is 36%; pH is 7.8; particle diameter is 110 nm.

Put 80 parts of polyisoprene aqueous emulsion and 20 parts of de-ionized water into the coagulator and fully blend the mixture. Put 20 parts of $CaCl_2$ and 150 parts of de-ionized water into the coagulating agent kettle and fully blend and dissolve it. Add $CaCl_2$ solution from the coagulating agent kettle into the coagulator in 4~60 min. Keep blending the mixture in the coagulator throughout the process and use 0.5% sulfuric acid solution to regulate the pH of serum in the coagulator to 5~7. After coagulation is completed, take the serum into a rinsing tank where it is stirred and rinsed with 2~3 times of fresh water for 1~1.5 h. The rinsed mixture is then filtered with a vibration sieve to obtain wet slab rubber. The wet slab rubber is then delivered by a conveyor belt into a horizontal centrifuge for dehydration for 20~30 min. Then it is delivered by a spiral material feeder into a spiral flash evaporation dryer for drying. The inlet temperature of the dryer is 110~130□. Material stays 10~15 s inside the dryer. Dry slab rubber containing less than 1% moisture can be thus obtained.

The physical and mechanical properties of obtained slab rubber are shown in Table 3.

Example 11

The amounts of starting materials are as shown in Table 2. Other technological conditions remain the same. The solid content of obtained emulsion is 36.2%; pH is 7.1; particle diameter is 183 nm. The physical and mechanical properties of obtained slab rubber are shown in Table 3.

Example 12

Nitrogen is pumped into the bottom of the polymerization kettle for 30 min, and then 110 parts of de-ionized water is added into the polymerization kettle, blend and dissolve dodecyl sodium benzene sulfonate (SBLS), cis-dodecyl mercaptan (DM), dispersing agent (MF), and NaHCO3 as shown in Table 2 to obtain an aqueous phase. Add all IP and CHP into the monomer kettle and blend and dissolve them to obtain an oil phase. Add 45 parts of de-ionized water and all $FeSO_4$ in to the reducing agent kettle and dissolve them to obtain an aqueous solution.

Keep the reaction temperature at 15□~30□ and perform Stage 1 dropwise addition. The amount of isoprene monomer (IP) and cumene hydroperoxide (CHP) added dropwise in Stage 1 is 10 wt % of their total weight. The amount of ferrous sulfate ($FeSO_4$) synchronously added dropwise is 10 wt % of its total weight. After the dropwise addition of Stage 1 is completed, allow the reaction for 1 h. After the reaction of Stage 1 is completed, start the dropwise addition of Stage 2. The amount of isoprene monomer (IP) and cumene hydroperoxide (CHP) added dropwise in Stage 2 is 20 wt % of their total weight. The amount of ferrous sulfate ($FeSO_4$) synchronously added dropwise is 20 wt % of its total weight. After the dropwise addition of Stage 2 is completed, allow the reaction for 2 h. After the reaction of Stage 2 is completed, start the dropwise addition of Stage 3. The rest of isoprene monomer (IP) and cumene hydroperoxide (CHP) is added dropwise in Stage 3. The rest amount of ferrous sulfate ($FeSO_4$) is synchronously added dropwise. After the dropwise addition is completed, further allow the reaction for 12~20 h to obtain stable white polyisoprene aqueous emulsion. After the polymerization is over, add 0.3 wt % terminating agent diethanolameine, based on the weight of isoprene and 2 wt % anti-aging agent 264, based on the weight of isoprene, and adjust the pH value to about 8.0. Raise the temperature to 50□. Remove the residual monomer. Its solid content is 37.5%; pH is 8.2; particle diameter is 128 nm.

Put 80 parts of polyisoprene aqueous emulsion and 20 parts of de-ionized water into the coagulator and fully blend the mixture. Put 20 parts of $CaCl_2$ and 150 parts of de-ionized water into the coagulating agent kettle and fully blend and dissolve it. Add $CaCl_2$ solution from the coagulating agent kettle into the coagulator in 40~60 min. Keep blending the mixture in the coagulator throughout the process and use 0.5% sulfuric acid solution to regulate the pH of serum in the coagulator to 5~7. After coagulation is completed, take the serum into a rinsing tank where it is stirred and rinsed with 2~3 times of fresh water for 1~1.5 h. The rinsed mixture is then filtered with a vibration sieve to obtain wet slab rubber. The wet slab rubber is then delivered by a conveyor belt into a horizontal centrifuge dehydration for 20~30 min. Then it is delivered by a spiral material feeder into a spiral flash evaporation dryer for drying. The inlet temperature of the dryer is 110~130□. Material stays 10~15 s inside the dryer. Dry slab rubber containing less than 1% moisture can be thus obtained.

The physical and mechanical properties of obtained slab rubber are shown in Table 3.

Example 13

The amounts of starting materials are as shown in Table 2. Other technological conditions remain the same. The solid content of obtained emulsion is 36.7%; pH is 6.8; particle diameter is 173.5 nm. The physical and mechanical properties of obtained slab rubber are shown in Table 3.

Example 14

The amount of $CaCl_2$ in the coagulating agent kettle in Example 10 is changed to 17 parts and de-ionized water is 170 parts. The time for the addition of $CaCl_2$ is 70 min. Other technological conditions remain the same. The physical and mechanical properties of obtained slab rubber are shown in Table 3.

Example 15

The amount of $CaCl_2$ in the coagulating agent kettle in Example 12 is changed to 17 parts and de-ionized water is 170 parts. The time for the addition of $CaCl_2$ is 70 min. Other technological conditions remain the same. The physical and mechanical properties of obtained slab rubber are shown in Table 3.

TABLE 2

Constituents and their amount in polyisoprene emulsion polymerization

| Constituent | Parts by weight | | | |
|---|---|---|---|---|
| | Example 10 | Example 11 | Example 12 | Example 13 |
| Isoprene (IP) | 100 | 100 | 100 | 100 |
| Disproportionated rosin acid potash soap (DRS) | 6.0 | 5.0 | 4.0 | 3.0 |
| Dodecyl sodium benzene sulfonate (SBLS) | 4.0 | 3.5 | 2.0 | 1.0 |
| Dispersing agent MF | 0.05 | 0.2 | 0.5 | 1.0 |
| Cumene hydroperoxide (CHP) | 0.3 | 0.4 | 0.6 | 0.8 |
| Ferrous sulfate (FeSO$_4$) | 0.3 | 0.4 | 0.6 | 0.8 |
| Cis-dodecyl mercaptan (DM) | 0.05 | 0.1 | 0.3 | 0.5 |
| Sodium bicarbonate (NaHCO$_3$) | 0.5 | 0.8 | 1.2 | 1.3 |
| Ethylenediamine tetraacetic acid (EDTA) | 0.2 | 0.3 | 0.4 | 0.5 |
| De-ionized water | 145 | 145 | 150 | 150 |
| Temperature, ° C. | 15~30 | 15~30 | 15~30 | 15~30 |
| Terminating agent diethanolameine | 0.08 | 0.1 | 0.3 | 0.5 |
| Anti-aging agent 264 | 0.5 | 1.0 | 2.0 | 2.5 |

TABLE 3

Physical and mechanical properties of emulsion polyisoprene rubber

| Item | Example 10 | Example 11 | Example 12 | Example 13 | Example 14 | Example 15 |
|---|---|---|---|---|---|---|
| Mooney viscosity, (ML$_{1+4}^{100}$) | 156 | 148 | 72 | 66 | 158 | 67 |
| Rupture strength, Mpa | 17.6 | 18.3 | 28.4 | 26.8 | 16.7 | 29.1 |
| Rupture elongation, % | 358 | 366 | 574 | 601 | 377 | 547 |
| Shore hardness, A | 79 | 82 | 58 | 51 | 74 | 46 |

Example 16

Nitrogen is pumped into the bottom of the polymerization kettle for 15 min, and then 110 parts of de-ionized water is added into the polymerization kettle. Blend and dissolve all ethylenediamine tetraacetic acid (EDTA), dodecyl sodium benzene sulfonate (SBLS), dodecyl sodium sulfate (SDS), dispersing agent (MF), cis-dodecyl mercaptan (DM), sodium pyrophosphate, NaHCO3, and Formosul (SFS) as shown in Table 4 to obtain an aqueous phase. Blend and dissolve isoprene monomer, acrylonitrile monomer, (methyl)acrylic acid, and benzoyl peroxide (BPO) to obtain an oil phase. Blend and dissolve 50 parts of de-ionized water and ferrous sulfate (FeSO$_4$) to obtain an aqueous phase.

Keep the reaction temperature at 10□~32□ and perform Stage 1 dropwise addition. The mixture amount of isoprene monomer, acrylonitrile monomer, (methyl)acrylic acid and benzoyl peroxide (BPO) added dropwise in Stage 1 is 5 wt % of their total mixture weight. The amount of ferrous sulfate (FeSO$_4$) synchronously added dropwise is 5 wt % of its total weight. After the dropwise addition of Stage 1 is completed, allow the reaction for 3 h. After the reaction of Stage 1 is completed, start the dropwise addition of Stage 2. The mixture amount of isoprene monomer, acrylonitrile monomer, (methyl)acrylic acid and benzoyl peroxide (BPO) added dropwise in Stage 2 is 15 wt % of the their total mixture weight. The amount of ferrous sulfate (FeSO$_4$) synchronously added dropwise is 15 wt % of its total weight. After the dropwise addition of Stage 2 is completed, allow the reaction for 3 h. After the reaction of Stage 2 is completed, start the dropwise addition of Stage 3. The rest of isoprene monomer, acrylonitrile monomer, (methyl)acrylic acid and benzoyl peroxide (BPO) is added dropwise in Stage 3. The rest of ferrous sulfate (FeSO$_4$) is synchronously added dropwise. After the reaction of Stage 3 is completed, further allow the reaction for 12~20 h to obtain stable white polynitrile aqueous emulsion. After the polymerization is over, add 0.2 wt % terminating agent diethanolameine, based on the weight of isoprene monomer, acrylonitrile monomer, and (methyl)acrylic acid and 1.0 wt % anti-aging agent 264, based on the weight of isoprene monomer, acrylonitrile monomer, and (methyl)acrylic acid, and adjust the pH value to about 8.0. Raise the temperature to 50□. Inject steam to keep the temperature, and keep a vacuum level higher than 8 Pa for 1~5 h to remove the residual monomer. Its solid content is 35.0%; pH is about 8.0; particle diameter is 80 nm.

Example 17

Nitrogen is pumped into the bottom of the polymerization kettle for 15 min, and then 110 parts of de-ionized water is add into the polymerization kettle. Blend and dissolve all ethylenediamine tetraacetic acid (EDTA), dodecyl sodium benzene sulfonate (SBLS), dodecyl sodium sulfate (SDS), dispersing agent (MF), cis-dodecyl mercaptan (DM), sodium pyrophosphate, NaHCO3, and Formosul (SFS) as shown in Table 4 to obtain an aqueous phase. Blend and dissolve isoprene monomer, acrylonitrile monomer, (methyl)acrylic acid, and benzoyl peroxide (BPO) to obtain an oil phase.

Blend and dissolve 50 parts of de-ionized water and ferrous sulfate (FeSO$_4$) to obtain an aqueous phase.

Keep the reaction temperature within 10□~32□ and perform Stage 1 dropwise addition. The mixture amount of isoprene monomer, acrylonitrile monomer, (methyl)acrylic acid and benzoyl peroxide (BPO) added dropwise in Stage 1 is 8 wt % of their total mixture weight. The amount of ferrous sulfate (FeSO$_4$) synchronously added dropwise is 8 wt % of its total weight. After the dropwise addition of Stage 1 is completed, allow the reaction for 2 h. After the reaction of Stage 1 is completed, start the dropwise addition of Stage 2. The mixture amount of isoprene monomer, acrylonitrile monomer, (methyl)acrylic acid and benzoyl peroxide (BPO) added dropwise in Stage 2 is 12 wt % of the their total mixture weight. The amount of ferrous sulfate (FeSO$_4$) synchronously added dropwise is 15 wt % of its total weight. After the dropwise addition of Stage 2 is completed, allow the reaction for 2 h. After the reaction of Stage 2 is completed, start the dropwise addition of Stage 3. The rest of isoprene monomer, acrylonitrile monomer, (methyl)acrylic acid and benzoyl peroxide (BPO) is added dropwise in Stage 3. The rest of ferrous sulfate (FeSO$_4$) is synchronously added dropwise. After the reaction of Stage 3 is completed, further allow the reaction for 12~20 h to obtain stable white polynitrile aqueous emulsion. After the polymerization is over, add 0.2 wt % terminating agent diethanolameine, based on the weight of isoprene monomer, acrylonitrile monomer, and (methyl)acrylic acid and 1.0 wt % anti-aging agent 264, based on the weight of isoprene monomer, acrylonitrile monomer, and (methyl)acrylic acid, and adjust the pH value to about 8.0. Raise the temperature to 50□. Inject steam to keep the temperature, and keep a vacuum level higher than 8 Pa for 1~5 h to remove the residual monomer. Its solid content is 36.5%; pH is around 7.8; particle diameter is 120 nm.

Example 18

Nitrogen is pumped into the bottom of the polymerization kettle for 15 min, and then 110 parts of de-ionized water is added into the polymerization kettle. Blend and dissolve all ethylenediamine tetraacetic acid (EDTA), dodecyl sodium benzene sulfonate (SBLS), dodecyl sodium sulfate (SDS), dispersing agent (MF), cis-dodecyl mercaptan (DM), sodium pyrophosphate, NaHCO3, and Formosul (SFS) as shown in Table 4 to obtain an aqueous phase. Blend and dissolve isoprene monomer, acrylonitrile monomer, (methyl)acrylic acid, and benzoyl peroxide (BPO) to obtain an oil phase. Blend and dissolve 50 parts of de-ionized water and ferrous sulfate (FeSO$_4$) to obtain an aqueous phase.

Keep the reaction temperature at 10□~32□ and perform Stage 1 dropwise addition. The mixture amount of isoprene monomer, acrylonitrile monomer, (methyl)acrylic acid and benzoyl peroxide (BPO) added dropwise in Stage 1 is 12 wt % of their total mixture weight. The amount of ferrous sulfate (FeSO$_4$) synchronously added dropwise is 12 wt % of its total weight. After the dropwise addition of Stage 1 is completed, allow the reaction for 1 h. After the reaction of Stage 1 is completed, start the dropwise addition of Stage 2. The mixture amount of isoprene monomer, acrylonitrile monomer, (methyl)acrylic acid and benzoyl peroxide (BPO) added dropwise in Stage 2 is 18 wt % of the their total mixture weight. The amount of ferrous sulfate (FeSO$_4$) synchronously added dropwise is 18 wt % of its total weight. After the dropwise addition of Stage 2 is completed, allow the reaction for 1 h. After the reaction of Stage 2 is completed, start the dropwise addition of Stage 3. The rest of isoprene monomer, acrylonitrile monomer, (methyl)acrylic acid and benzoyl peroxide (BPO) is added dropwise in Stage 3. The rest of ferrous sulfate (FeSO$_4$) is synchronously added dropwise. After the reaction of Stage 3 is completed, further allow the reaction for 12~20 h to obtain stable white polynitrile aqueous emulsion. After the polymerization is over, add 0.2 wt % terminating agent diethanolameine, based on the weight of isoprene monomer, acrylonitrile monomer, and (methyl)acrylic acid and 1.0 wt % anti-aging agent 264, based on the weight of isoprene monomer, acrylonitrile monomer, and (methyl)acrylic acid, and adjust the pH value to about 8.0. Raise the temperature to 50□. Inject steam to keep the temperature, and keep a vacuum level higher than 8 Pa for 1~5 h to remove the residual monomer. Its solid content is 38.5%; pH is about 8.2; particle diameter is 110 nm.

Example 19

Nitrogen is pumped into the bottom of the polymerization kettle for 15 min, and then 110 parts of de-ionized water is added into the polymerization kettle. Blend and dissolve all ethylenediamine tetraacetic acid (EDTA), dodecyl sodium benzene sulfonate (SBLS), dodecyl sodium sulfate (SDS), dispersing agent (MF), cis-dodecyl mercaptan (DM), sodium pyrophosphate, NaHCO3, and Formosul (SFS) as shown in Table 4 to obtain an aqueous phase. Blend and dissolve isoprene monomer, acrylonitrile monomer, (methyl)acrylic acid, and benzoyl peroxide (BPO) to obtain an oil phase. Blend and dissolve 50 parts of de-ionized water and ferrous sulfate (FeSO$_4$) to obtain an aqueous phase.

Keep the reaction temperature at 10□~32□ and perform Stage 1 dropwise addition. The mixture amount of isoprene monomer, acrylonitrile monomer, (methyl)acrylic acid and benzoyl peroxide (BPO) added dropwise in Stage 1 is 15 wt % of their total mixture weight. The amount of ferrous sulfate (FeSO$_4$) synchronously added dropwise is 15 wt % of its total weight. After the dropwise addition of Stage 1 is completed, allow the reaction for 0.5 h. After the reaction of Stage 1 is completed, start the dropwise addition of Stage 2. The mixture amount of isoprene monomer, acrylonitrile monomer, (methyl)acrylic acid and benzoyl peroxide (BPO) added dropwise in Stage 2 is 20 wt % of the their total mixture weight. The amount of ferrous sulfate (FeSO$_4$) synchronously added dropwise is 20 wt % of its total weight. After the dropwise addition of Stage 2 is completed, allow the reaction for 0.5 h. After the reaction of Stage 2 is completed, start the dropwise addition of Stage 3. The rest of isoprene monomer, acrylonitrile monomer, (methyl)acrylic acid and benzoyl peroxide (BPO) is added dropwise in Stage 3. The rest of ferrous sulfate (FeSO$_4$) is synchronously added dropwise. After the reaction of Stage 3 is completed, further allow the reaction for 12~20 h to obtain stable white polynitrile aqueous emulsion. After the polymerization is over, add 0.2 wt % terminating agent diethanolameine, based on the weight of isoprene monomer, acrylonitrile monomer, and (methyl)acrylic acid and 1.0 wt % anti-aging agent 264, based on the weight of isoprene monomer, acrylonitrile monomer, and (methyl)acrylic acid, and adjust the pH value to about 8.0. Raise the temperature to 50□. Inject steam to keep the temperature, and keep a vacuum level higher than 8 Pa for 1~5 h to remove the residual monomer. Its solid content is 38%; pH is about 8.5; particle diameter is 150 nm.

TABLE 4

Constituents in the polymerization of polynitrile aqueous emulsion

| | Parts by weight | | | |
|---|---|---|---|---|
| Constituent | Example 16 | Example 17 | Example 18 | Example 19 |
| Isoprene (IP) | 50 | 65 | 80 | 94 |
| Acrylonitrile (AN) | 42 | 30 | 27 | 5 |
| (Methyl)acrylic acid | 8 | 5 | 3 | 1 |
| Ethylenediamine tetraacetic acid (EDTA) | 0.0125 | 0.125 | 0.3125 | 0.625 |
| Sodium pyrophosphate ($Na_4P_2O_7$) | 0.3125 | 0.625 | 1.875 | 3.125 |
| Formosul (SFS) | 0.0125 | 0.125 | 0.3125 | 0.625 |
| Nonyl phenol polyoxyethylene ether (OP-10) | 1 | 4 | 4 | 2 |
| Dodecyl sodium sulfate (SDS) | 0.5 | 1.5 | 3 | 5 |
| Dodecyl sodium benzene sulfonate (SBLS) | 0.5 | 1.5 | 3 | 5 |
| Benzoyl peroxide (BPO) | 0.2 | 0.4 | 2 | 2.6 |
| Ferrous sulfate ($FeSO_4$) | 0.2 | 0.4 | 2 | 2.6 |
| Sodium bicarbonate ($NaHCO_3$) | 0.125 | 0.5 | 1 | 1.25 |
| Dispersing agent (MF) | 0.05 | 0.1 | 0.5 | 1 |
| Cis-dodecyl mercaptan (DM) | 0.125 | 0.125 | 0.3125 | 0.625 |
| De-ionized water | 160 | 160 | 160 | 160 |
| Accelerating agent diethanolameine | 0.08 | 0.2 | 0.5 | 0.8 |
| Anti-aging agent 264 | 0.5 | 1 | 2 | 2.5 |

Example 20

Prepare an aqueous solution system with 100 parts of polynitrile aqueous emulsion fabricated in Example 16, 0.5 parts of sulfur 100-500 nm in particle diameter, and 0.5 parts of zinc dioxide. Ball-grind it for more than 72 h to obtain 500 mg/h aqueous dispersion, and then add the obtained aqueous dispersion into polynitrile aqueous emulsion and fully mix them. Blend the mixture under 40☐~60☐ for 1 h, and perform pre-sulfurization. After pre-sulfurization, rest the polynitrile aqueous emulsion 24 h under room temperature for curing, then take it to the glove production line together with a prepared coagulating agent of calcium nitrate aqueous solution with a weight percentage concentration of 15~30%.

The ion-deposition gelatinizing process is adopted for the entire dip forming process of gloves, the specific steps being as follows:

1. Mold cleaning: dry the mold under 60~100☐ for 0.5~5 minutes.
2. Dipping coagulating agent: dry the coagulating agent under 60~120☐ for 0.5~8 minutes.
3. Dipping emulsion: dry the emulsion under 60~100☐ for 0.5~5 minutes.
4. Percolation and edge curling under 50~70☐;
5. Cross-bonding: perform cross-bonding under 80~120☐ for 1~10 minutes.
6. Demolding;
7. Rinsing and percolation with 50~80☐ hot water, and post-treatment to obtain gloves and related thin latex products.

The film thickness of transparent latex gloves obtained is 0.03-0.2 mm, the rupture strength is greater than 14 MPa, and the rupture elongation is greater than 650%. The film has a good hand touch and strong rebound resilience.

Example 21

Prepare an aqueous solution system with 100 parts of polynitrile aqueous emulsion fabricated in Example 17, 1 part of sulfur 100~500 nm in particle diameter, and 1 part of zinc dioxide. Ball-grind it for more than 72 h to obtain 500 mg/h aqueous dispersion, and then add the obtained aqueous dispersion into polynitrile aqueous emulsion and fully mix them. Blend the mixture under 40☐~60☐ for 1 h, and perform pre-sulfurization. After pre-sulfurization, rest the polynitrile aqueous emulsion 24 h under room temperature for curing, then take it to the glove production line together with a prepared coagulating agent of Calcium chloride aqueous solution with a weight percentage concentration of 15~30%.

The ion-deposition gelatinizing process is adopted for the entire dip forming process of gloves, the specific steps being as follows:

1. Mold cleaning: dry the mold under 60~100☐ for 0.5~5 minutes.
2. Dipping coagulating agent: dry the coagulating agent under 60~120☐ for 0.5~8 minutes.
3. Dipping emulsion: dry the emulsion under 60~100☐ for 0.5~5 minutes.
4. Percolation and edge curling under 50~70☐;
5. Cross-bonding: perform cross-bonding under 80~120☐ for 1~10 minutes.
6. Demolding;
7. Rinsing and percolation with 50~80☐ hot water, and post-treatment to obtain gloves and related thin latex products.

The film thickness of transparent latex gloves obtained is 0.03~0.2 mm, the rupture strength is greater than 14 MPa, and the rupture elongation is greater than 650%. The film has a good hand touch and strong rebound resilience.

Example 22

Prepare an aqueous solution system with 100 parts of polynitrile aqueous emulsion fabricated in Example 18, 2.0 parts of sulfur 100-500 nm in particle diameter, and 1 part of zinc dioxide, and 1 parts of sulfurization accelerating agent BZ. Ball-grind it for more than 72 h to obtain 500 mg/h aqueous dispersion, and then add the obtained aqueous dispersion into polynitrile aqueous emulsion and fully mix them. Blend the mixture under 40° C.-60° C. for 1.5 h, and perform pre-sulfurization. After pre-sulfurization, rest the polynitrile aqueous emulsion 24 h under room temperature for curing, then take it to the glove production line together with a prepared coagulating agent of Zinc chloride aqueous solution with a weight percentage concentration of 15~30%.

The ion-deposition gelatinizing process is adopted for the entire dip forming process of gloves, the specific steps being as follows:

1. Mold cleaning: dry the mold under 60~100° C. for 0.5~5 minutes.
2. Dipping coagulating agent: dry the coagulating agent under 60~120° C. for 0.5~8 minutes.
3. Dipping emulsion: dry the emulsion under 60~100° C. for 0.5~5 minutes.
4. Percolation and edge curling under 50~70° C.;
5. Cross-bonding: perform cross-bonding under 80~120° C. for 1~10 minutes.
6. Demolding;
7. Rinsing and percolation with 50~80☐ hot water, and post-treatment to obtain gloves and related thin latex products.

The film thickness of transparent latex gloves obtained is 0.03-0.2 mm, the rupture strength is greater than 14 MPa, and the rupture elongation is greater than 650%. The film has a good hand touch and strong rebound resilience.

Example 23

Prepare an aqueous solution system with 100 parts of polynitrile aqueous emulsion fabricated in Example 19, 1.5 parts of sulfur 100-500 nm in particle diameter, and 0.5 parts of zinc dioxide, and 1 parts of sulfurization accelerating agent BZ. Ball-grind it for more than 72 h to obtain 500 mg/h aqueous dispersion, and then add the obtained aqueous dispersion into polynitrile aqueous emulsion and fully mix them. Blend the mixture under 40° C.-60° C. for 1 h, and perform pre-sulfurization. After pre-sulfurization, rest the polynitrile aqueous emulsion 24 h under room temperature for curing, then take it to the glove production line together with a prepared coagulating agent of Zinc nitrate aqueous solution with a weight percentage concentration of 15~30%.

The ion-deposition gelatinizing process is adopted for the entire dip forming process of gloves, the specific steps being as follows:
 1. Mold cleaning: dry the mold under 60~100° C. for 0.5~5 minutes.
 2. Dipping coagulating agent: dry the coagulating agent under 60~120° C. for 0.5~8 minutes.
 3. Dipping emulsion: dry the emulsion under 60~100° C. for 0.5~5 minutes.
 4. Percolation and edge curling under 50~70° C.;
 5. Cross-bonding: perform cross-bonding under 80~120° C. for 1~10 minutes.
 6. Demolding;
 7. Rinsing and percolation with 50~80□ hot water, and post-treatment to obtain gloves and related thin latex products.

The film thickness of transparent latex gloves obtained is 0.03-0.2 mm, the rupture strength is greater than 14 MPa, and the rupture elongation is greater than 650%. The film has a good hand touch and strong rebound resilience.

Example 24

Nitrogen is pumped into the bottom of the polymerization kettle for 30 min, and then 110 parts of de-ionized water is added into the polymerization kettle, blend and dissolve dodecyl sodium benzene sulfonate (SBLS), cis-dodecyl mercaptan (DM), dispersing agent (MF), and NaHCO3 as shown in Table 5 to obtain an aqueous phase. Add all isoprene monomer, acrylonitrile monomer, (methyl)acrylic acid and benzoyl peroxide (BPO) into the monomer kettle and blend and dissolve them to obtain an oil phase. Add 45 parts of de-ionized water and all $FeSO_4$ in to the reducing agent kettle and dissolve them to obtain an aqueous solution.

Keep the reaction temperature at 15□~30□ and perform Stage 1 dropwise addition. The mixture amount of isoprene monomer, acrylonitrile monomer, (methyl)acrylic acid and benzoyl peroxide (BPO) added dropwise in Stage 1 is 10% of their total mixture weight. The amount of ferrous sulfate ($FeSO_4$) synchronously added dropwise is 10% of its total weight. After the dropwise addition of Stage 1 is completed, allow the reaction for 1 h. After the reaction of Stage 1 is completed, start the dropwise addition of Stage 2. The mixture amount of isoprene monomer, acrylonitrile monomer, (methyl)acrylic acid and benzoyl peroxide (BPO) added dropwise in Stage 2 is 20% of their mixture weight. The amount of ferrous sulfate ($FeSO_4$) synchronously added dropwise is 20% of its total weight. After the dropwise addition of Stage 2 is completed, allow the reaction for 2 h. After the reaction of Stage 2 is completed, start the dropwise addition of Stage 3. The rest of isoprene monomer, acrylonitrile monomer, (methyl)acrylic acid and benzoyl peroxide (BPO) is added dropwise in Stage 3. The rest of ferrous sulfate ($FeSO_4$) is synchronously added dropwise. After the dropwise addition is completed, further allow the reaction for 12~20 h to obtain stable white polyisoprene aqueous emulsion. After the polymerization is over, add 0.08 wt % terminating agent diethanolameine, based on the weight of polynitrile aqueous emulsion and 0.5 wt % anti-aging agent 264, based on the weight of polynitrile aqueous emulsion, and adjust the pH value to about 8.0. Raise the temperature to 50□. Remove the residual monomer. Its solid content is 36%; pH is 7.8; particle diameter is 110 nm.

Put 80 parts of polynitrile aqueous emulsion and 20 parts of de-ionized water into the coagulator and fully blend the mixture. Put 20 parts of $CaCl_2$ and 150 parts of de-ionized water into the coagulating agent kettle and fully blend and dissolve it. Add $CaCl_2$ solution from the coagulating agent kettle into the coagulator in 40~60 min. Keep blending the mixture in the coagulator throughout the process and use 0.5% sulfuric acid solution to regulate the pH of serum in the coagulator to 5~7. After coagulation is completed, take the serum into a rinsing tank where it is stirred and rinsed with 2~3 times of fresh water for 1~1.5 h. The rinsed mixture is then filtered with a vibration sieve to obtain wet slab rubber. The wet slab rubber is then delivered by a conveyor belt into a horizontal centrifuge for dehydration for 20~30 min. Then it is delivered by a spiral material feeder into a spiral flash evaporation dryer for drying. The inlet temperature of the dryer is 110~130□. Material stays 10~15 s inside the dryer. Dry slab rubber containing less than 1% moisture can be thus obtained.

The physical and mechanical properties of obtained slab rubber are shown in Table 6.

Example 25

The amounts of starting materials are as shown in Table 5. Other technological conditions remain the same. The solid content of obtained emulsion is 36.2%; pH is 7.1; particle diameter is 183 nm. The physical and mechanical properties of obtained slab rubber are shown in Table 3.

Example 26

Nitrogen is pumped into the bottom of the polymerization kettle for 30 min, and then 110 parts of de-ionized water is added into the polymerization kettle, blend and dissolve dodecyl sodium benzene sulfonate (SBLS), cis-dodecyl mercaptan (DM), dispersing agent (MF), and NaHCO3 as shown in Table 2 to obtain an aqueous phase. Add all isoprene monomer, acrylonitrile monomer, (methyl)acrylic acid and benzoyl peroxide (BPO) into the monomer kettle and blend and dissolve them to obtain an oil phase. Add 45 parts of de-ionized water and all $FeSO_4$ in to the reducing agent kettle and dissolve them to obtain an aqueous solution.

Keep the reaction temperature at 15° C.~30° C. and perform Stage 1 dropwise addition. The mixture amount of isoprene monomer, acrylonitrile monomer, (methyl)acrylic acid and benzoyl peroxide (BPO) added dropwise in Stage 1 is 10% of their total mixture weight. The amount of ferrous sulfate ($FeSO_4$) synchronously added dropwise is 10% of its total weight. After the dropwise addition of Stage 1 is completed, allow the reaction for 1 h. After the reaction of Stage 1 is completed, start the dropwise addition of Stage 2. The mixture amount of isoprene monomer, acrylonitrile monomer, (methyl)acrylic acid and benzoyl peroxide (BPO) added dropwise in Stage 2 is 20% of their total mixture weight. The amount of ferrous sulfate ($FeSO_4$) synchronously added dropwise is 20% of its total weight. After the dropwise addition of Stage 2 is completed, allow the reaction for 2 h. After the reaction of Stage 2 is completed, start the dropwise addition of Stage 3. The rest of isoprene monomer, acrylonitrile monomer, (methyl)acrylic acid and benzoyl peroxide (BPO) is added dropwise in Stage 3. The rest of ferrous sulfate ($FeSO_4$) is synchronously added dropwise. After the dropwise addition is completed, further allow the reaction for 12~20 h to obtain stable white polyisoprene aqueous emulsion. After the polymerization is over, add 0.3 wt % terminating agent diethanolameine, based on the weight of polynitrile aqueous emulsion and 2 wt % anti-aging agent 264, based on the weight of polynitrile aqueous emulsion, and adjust the pH value to about 8.0. Raise the temperature to 50° C. Remove the residual monomer. Its solid content is 37.5%; pH is 8.2; particle diameter is 128 nm.

Put 80 parts of polynitrile aqueous emulsion and 20 parts of de-ionized water into the coagulator and fully blend the mixture. Put 20 parts of $CaCl_2$ and 150 parts of de-ionized water into the coagulating agent kettle and fully blend and dissolve it. Add $CaCl_2$ solution from the coagulating agent kettle into the coagulator in 40~60 min. Keep blending the mixture in the coagulator throughout the process and use 0.5% sulfuric acid solution to regulate the pH of serum in the coagulator to 5~7. After coagulation is completed, take the serum into a rinsing tank where it is stirred and rinsed with 2~3 times of fresh water for 1~1.5 h. The rinsed mixture is then filtered with a vibration sieve to obtain wet slab rubber. The wet slab rubber is then delivered by a conveyor belt into a horizontal centrifuge for dehydration for 20~30 min. Then it is delivered by a spiral material feeder into a spiral flash evaporation dryer for drying. The inlet temperature of the dryer is 110~130° C. Material stays 10~15 s inside the dryer. Dry slab rubber containing less than 1% moisture can be thus obtained.

The physical and mechanical properties of obtained slab rubber are shown in Table 6.

Example 27

The amounts of starting-materials are as shown in Table 5. Other technological conditions remain the same. The solid content of obtained emulsion is 36.7%; pH is 6.8; particle diameter is 173.5 nm. The physical and mechanical properties of obtained slab rubber are shown in Table 5.

Example 28

The amount of $CaCl_2$ in the coagulating agent kettle in Example 24 is changed to 17 parts and de-ionized water is 170 parts. The time for the addition of $CaCl_2$ is 70 min. Other technological conditions remain the same. The physical and mechanical properties of obtained slab rubber are shown in Table 3.

Example 29

The amount of $CaCl_2$ in the coagulating agent kettle in Example 26 is changed to 17 parts and de-ionized water is 170 parts. The time for the addition of $CaCl_2$ is 70 min. Other technological conditions remain the same. The physical and mechanical properties of obtained slab rubber are shown in Table 3.

TABLE 5

Constituents and their amount in polynitrile emulsion polymerization

| | Parts by mass | | | |
| --- | --- | --- | --- | --- |
| Constituent | Example 24 | Example 25 | Example 26 | Example 27 |
| Isoprene (IP) | 50 | 65 | 80 | 94 |
| Acrylonitrile (AN) | 42 | 30 | 27 | 5 |
| (Methyl)acrylic acid | 8 | 5 | 3 | 1 |
| Disproportionated rosin acid potash soap (DRS) | 6.0 | 5.0 | 4.0 | 3.0 |
| Dodecyl sodium benzene sulfonate (SBLS) | 4.0 | 3.5 | 2.0 | 1.0 |
| Dispersing agent MF | 0.05 | 0.2 | 0.5 | 1.0 |
| Cumene hydroperoxide (CHP) | 0.3 | 0.4 | 0.6 | 0.8 |
| Ferrous sulfate ($FeSO_4$) | 0.3 | 0.4 | 0.6 | 0.8 |
| Cis-dodecyl mercaptan (DM) | 0.05 | 0.1 | 0.3 | 0.5 |
| Sodium bicarbonate ($NaHCO_3$) | 0.5 | 0.8 | 1.2 | 1.3 |
| Ethylenediamine tetraacetic acid (EDTA) | 0.2 | 0.3 | 0.4 | 0.5 |
| De-ionized water | 145 | 145 | 150 | 150 |
| Temperature, ° C. | 15~30 | 15~30 | 15~30 | 15~30 |
| Terminating agent diethanolameine | 0.08 | 0.1 | 0.3 | 0.5 |
| Anti-aging agent 264 | 0.5 | 1.0 | 2.0 | 2.5 |

TABLE 6

Physical and mechanical properties of isonitrile rubber

| Item | Example 24 | Example 25 | Example 26 | Example 27 | Example 28 | Example 29 |
|---|---|---|---|---|---|---|
| Mooney viscosity, ($ML_{1+4}^{100}$) | 156 | 148 | 72 | 66 | 158 | 67 |
| Rupture strength, Mpa | 17.6 | 18.3 | 28.4 | 26.8 | 16.7 | 29.1 |
| Rupture elongation, % | 358 | 366 | 574 | 601 | 377 | 547 |
| Shore hardness, A | 79 | 82 | 58 | 51 | 74 | 46 |

The invention claimed is:

1. A method for the fabrication of a polyisoprene or polynitrile aqueous emulsion useful in the manufacture of, gloves and related products, wherein the aqueous emulsion is a stable polyisoprene aqueous emulsion or polynitrile aqueous emulsion obtained through free-radical emulsion polymerization initiated by an initiating agent under normal pressure of isoprene as the monomer, or of a 50-94 wt % isoprene monomer, 5~42 wt % acrylonitrile monomer, and 1-8 wt % (methyl) acrylic acid as a monomer mixture, with an emulsifying agent and dispersing agent as an emulsification system, and an oxidation-reduction initiating system, characterized in that: after said isoprene or mixture of isoprene monomer, acrylonitrile monomer, and (methyl) acrylic acid is mixed with the initiating agent, and an oil phase obtained, the oil phase together with a reducing agent in the oxidation-reduction initiating system, is added dropwise in different time quantums.

2. The method according to claim 1, characterized in that: said dropwise addition is divided into three stages; for the oil phase stage 1, the amount of dropwise added reducing agent is 5-15 wt % of their respective total weight; for the oil phase of stage 2, the amount of dropwise added reducing agent is 10-20 wt % of their respective total weight; for the oil phase of stage 3, the amount of dropwise added reducing agent is 65-85 wt % of their respective total weight.

3. The method according to claim 1, characterized in that in the monomer mixture the acrylonitrile monomer is 20%-40% wt.

4. The method according to claim 1, characterized in that said initiating agent is peroxide, the dosage being 0.02~0.08% wt of the weight of isoprene monomer or of the monomer mixture of isoprene monomer, acrylonitrile monomer, and (methyl)acrylic acid.

5. The method according to claim 4, characterized in that said peroxide is acryl peroxide or hydroperoxide or a mixture thereof.

6. The method according to claim 5, characterized in that said acryl peroxide is benzoyl peroxide (BPO).

7. The method according to claim 5, characterized in that said hydroperoxide is tert-butyl hydroperoxide or di-isopropylbenzene hydroperoxide.

8. The method according to claim 1, characterized in that said emulsifying agent is an anion-type emulsifying agents or a non-ion emulsifying agent, or a mixture thereof.

9. The method according to claim 8, characterized in that said anion-type emulsifying agent is an alkyl sulfate, alkane sulfonate, alkylbenzene sulfonate, or long-chain fatty acid salt, the dosage being 2~12 wt % of the total weight of isoprene monomer or of the monomer mixture of isoprene monomer, acrylonitrile monomer, and (methyl)acrylic acid.

10. The method according to claim 8, characterized in that said non-ion emulsifying agent is alkyl phenol polyethylene glycol oxide.

11. The method according to claim 8, characterized in that said emulsifying agent mixture of an anion-type emulsifying agent and a non-ion emulsifying agent has a compound weight ratio of 9:1-1:9, being 4-15 wt % of the total weight of isoprene monomer or of the monomer mixture of isoprene monomer, acrylonitrile monomer, and (methyl)acrylic acid.

12. The method according to claim 1, characterized in that: said dispersing agent is a condensed formaldehyde naphthalene sulfonate, said condensed formaldehyde naphthalene sulfonate being a commercial MF dispersing agent, NF dispersing agent, N dispersing agent, or a dispersing agent mixture composed of two or more of such dispersing agents, the dosage being 0.05~1 wt % of the total weight of isoprene monomer or of the monomer mixture of isoprene monomer, acrylonitrile monomer, and (methyl)acrylic acid.

13. The method according to claim 1, characterized in that the reducing agent in the oxidation-reduction initiating system is sodium bisulfite, sodium formaldehyde sulfoxylate, sodium thiosulfate, sodium hydrosulfite, ferrous sulfate, ferrous chloride, or ascorbic acid, or a mixture of two or more of such reducing agents, and the dosage is controlled within 0.22-2.6 wt % of the total weight of isoprene monomer or of the monomer mixture of isoprene monomer, acrylonitrile monomer, and (methyl)acrylic acid.

14. The method according to claim 1, characterized in that a molecular weight regulating agent is selected to control the molecular weights polyisoprene aqueous emulsion or polynitrile aqueous emulsion, said molecular weight regulating agent being n-dodecyl mercaptan, n-tetradecyl mercaptan, n-hexadecyl mercaptan, t-dodecyl mercaptan, t-tetradecyl mercaptan, or t-hexadecyl mercaptan, of a mixture of two or more of such agents, and the dosage is controlled within 0.05-0.8 wt % of the total weight of isoprene monomer or of the monomer mixture of isoprene monomer, acrylonitrile monomer, and (methyl)acrylic acid.

15. The method according to claim 1, characterized in that a tank reactor is used for the polymerization of said polyisoprene aqueous emulsion or polynitrile aqueous emulsion; and the reaction is carried out under normal pressure; the reaction temperature is 20~32° C.; the total reaction time is 25~40 h; and when the conversion rate of the reaction reaches above 97.5%, terminating agent and anti-aging agent is added to terminate the reaction; and when the reaction is terminated, the polyisoprene aqueous emulsion or polynitrile aqueous emulsion is transferred into a degasification kettle where it passes through flash evaporation and steam to remove residual monomer.

* * * * *